United States Patent [19]

Mergenthaler

[11] Patent Number: 5,013,098
[45] Date of Patent: May 7, 1991

[54] METHOD AND APPARATUS FOR FEEDBACK-FREE ABS CONTROL

[75] Inventor: Robert Mergenthaler, Markgroeningen, Fed. Rep. of Germany

[73] Assignee: Robert Bosch GmbH, Stuttgart, Fed. Rep. of Germany

[21] Appl. No.: 546,594

[22] Filed: Jun. 29, 1990

[30] Foreign Application Priority Data

Jul. 1, 1989 [DE] Fed. Rep. of Germany ....... 3921683

[51] Int. Cl.[5] .................. B60T 8/32; B60T 13/12; B60T 13/68
[52] U.S. Cl. .................................. 303/119; 303/92; 303/114; 303/115
[58] Field of Search ............... 303/113, 114, 115, 116, 303/117, 119, 61-63, 68-69, 92, 100, 110; 188/181 A, 355-358

[56] References Cited

U.S. PATENT DOCUMENTS

4,775,196 10/1988 Braschel et al. ................. 303/119

OTHER PUBLICATIONS

Bosch Technische Berichte; English Special Edition (Feb. 1980) ISSN0006-79X, pp. 75,76.

*Primary Examiner*—Douglas C. Butler
*Attorney, Agent, or Firm*—Edwin E. Greigg; Ronald E. Greigg

[57] ABSTRACT

A system for feedback-free ABS control in hydraulic brakes for mobile units, motor vehicles, motorcycles, and the like, equipped with a pedal-actuated master brake cylinder with a hydraulic brake booster and at least one isolation or shutoff valve in the form of a 3/2-way magnetic valve, which in normal operation is supplied with pressure by the master brake cylinder booster and is also assigned a plunger-piston for performing an ABS control. A check valve is disposed in the connecting line between the isolation valve, the ABS magnetic valve and the plunger-piston, or in a common supply line from the dynamic circuit of the master brake cylinder to these three actuating elements, as additional protection for the isolation valve and to assure the required brake pressure, even in the case of a failure, to keep the chambers of the hydraulic isolation valve and the rear chamber of the plunger-piston under pressure and in this way arrest the pistons so that they cannot move during normal braking operation. A pressure control valve can be disposed parallel to the check valve to limit the pressure in case of expansion of the fluid in the chambers, for example, by heating.

9 Claims, 3 Drawing Sheets

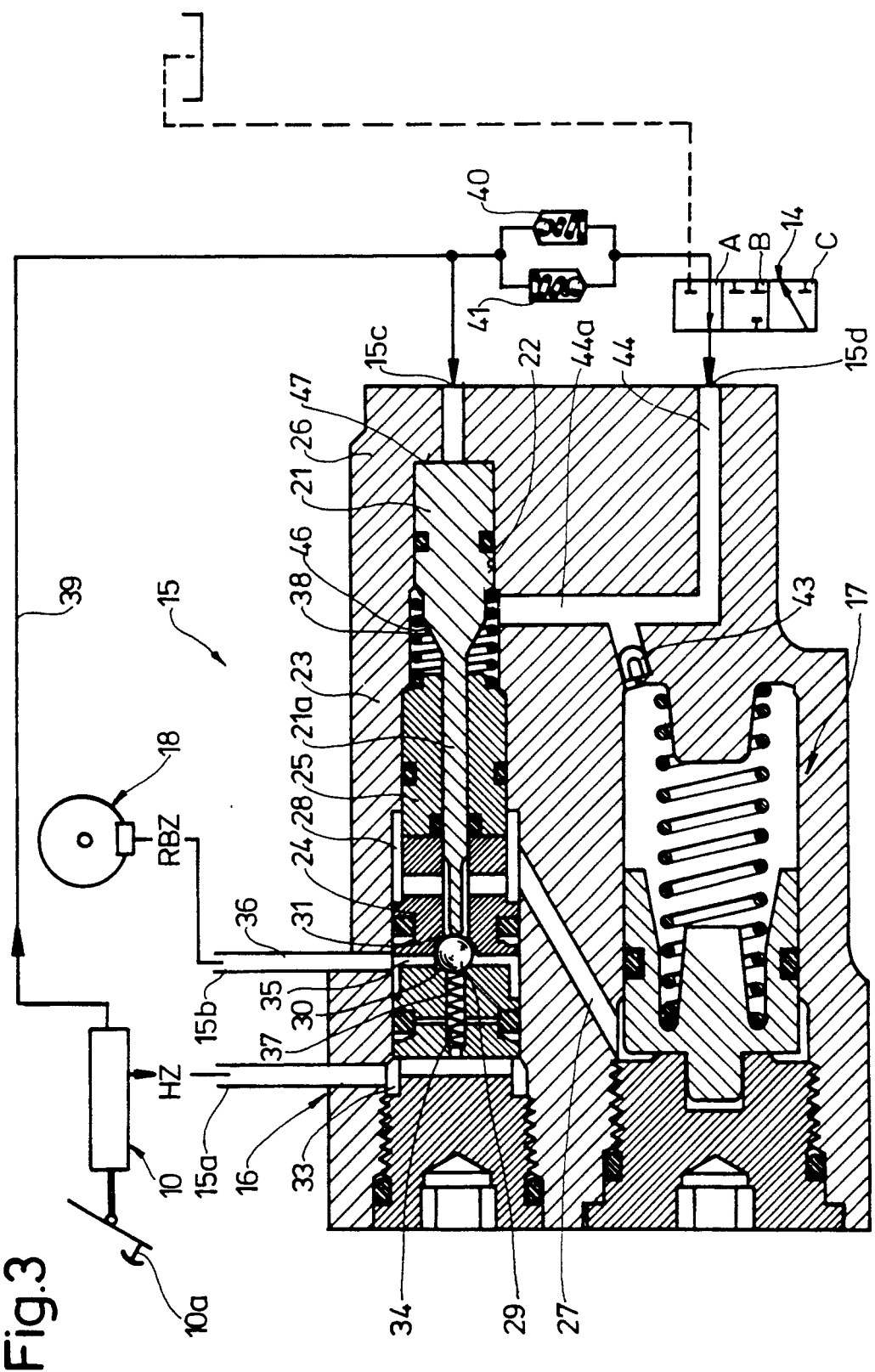

METHOD AND APPARATUS FOR FEEDBACK-FREE ABS CONTROL

RELATED APPLICATIONS

This application relates to subject matter generally similar to other applications filed simultaneously by the same assignee, the applications being identified by German Patent Appl. Nos. P 39 21 682.9 and P 39 21 681.0, R.22748 and R.22747, respectively, and further identified by Ser. Nos. 545,747, and 545,749, filed in the U.S. Patent and Trademark Office on June 29, 1990.

BACKGROUND OF THE INVENTION

The invention relates to a method and apparatus for performing a feedback-free ABS control.

OBJECT AND SUMMARY OF THE INVENTION

The use of such plunger systems which are capable of performing ABS operations without a noticeable feedback in the brake pedal of the master brake cylinder is known in many forms.

It is possible to infer the basic operation of a hydraulic control unit for feedback-free ABS operation with the use of plunger-pistons from an article "Mehr Sicherheit beim Bremsen" (Increased Safety When Braking) in the periodical fluid, January 1984, page 10. In the customary manner, this known hydraulic control unit for an anti-skid braking system comprises wheel sensors, an electronic regulation and control system as well as the hydraulic control unit. The hydraulic control unit provides a check valve in the connecting line between the pedal-operated master brake cylinder and the respective wheel brake cylinder as well as a plunger-piston, parallel to it and downstream of the check valve, which removes amounts of pressure fluid from the line and the wheel brake cylinders associated therewith when triggered in the course of ABS operation, thereby closing the check valve in the direction to the master brake cylinder, and then performs the ABS operations independently of the master brake cylinder and in accordance with the operational requirements. In this connection the electronic regulation and control system assures that, by means of predetermined pressure gradients, a pressure that takes the diverse road conditions into account is present in the brake system. When the pedal force on the master brake cylinder is reduced, the check valve can open again, so that the line between it and the associated wheel brake cylinders is again open.

Comparable with this is the arrangement of controlled check valves between the master brake cylinder and the combination of wheel brake and plunger cylinder (German Offenlegungsschrift DE-OS 20 45 689), where the actuation of the plunger cylinder is accomplished by means of an auxiliary pressure from a magnetic valve.

Furthermore, the use of a plunger-type operational pump with its own reservoir is recited in a publication "Bosch Technische Berichte" [Bosch Technical Reports] 7 (1980), page 76, FIG. 14d, which can be optionally called to assist in the supply of a brake booster.

The present invention relates particularly to an ABS system comprising a hydraulic brake booster and ABS magnetic valves associated with each wheel or with a defined combination of wheels. The unit additionally provides a hydraulic 3/2-way valve as an isolation valve and a plunger-piston. With such a hydraulic brake with brake booster and ABS magnetic valves, it is the purpose of the isolation or shutoff valve to keep the connection between the brake booster and the wheel brake cylinders open during normal braking operation, while in the case of ABS operation the isolation valve in its role as a 3/2-way valve shuts off the connection with the hydraulic booster and opens a hydraulic line connection between the wheel brake cylinders and the plunger-piston which, in turn, is acted upon by the ABS valves which are customarily in the form of 3/3-way valves. The pressure supplied by the brake valve of the hydraulic brake booster is used for the control of the plungers, provided that by means of the design of the hydraulic booster unit the pressures from the master brake cylinder during normal braking operation and the pressure supplied to the plunger via the ABS magnetic valves are equal.

In such a hydraulic brake booster with an ABS plunger system, problems can possibly arise with respect to tightness as well as unsatisfactory bleeding. The tightness of the hydraulic 3/2-way valves as isolation valves in their position of repose should particularly be considered to be critical. Damage in the course of operation, for example from metal chips or dirt, cannot be detected, so that it is additionally possible that the dynamic circuit may fail, with residual brake pressures that may, for example, fall far below the brake pressures mandated by Law. It is furthermore possible that operational impairment during rapid braking may arise in case of unsatisfactory bleeding of the hydraulic shutoff valve and plunger.

It is therefore an object of the invention to assure, in particular in connection with an ABS system comprising a hydraulic brake booster with a hydraulic shutoff valve and associated plunger-pistons, that problems of tightness in the area of the isolation and shutoff valve as well as operational impairment because of unsatisfactory bleeding are precluded.

This object is attained by means of features set forth herein which has an advantage that results in additional protection of the 3/2-way valve as an isolation valve between the brake booster and the area of the ABS operation, while preventing the piston of the isolation valve from taking up material from the master brake cylinder or even performing movements during normal braking operation. During braking, the system makes it possible to supply pressure fluid to the chambers of the hydraulic isolation valve or the rear of the plunger-piston, while a reverse flow is prevented, so that the chambers of the hydraulic isolation valve as well as the rear chamber of the plunger-piston are maintained under pressure. Because of this, the pistons (plunger-piston and regulating piston of the isolation valve) are arrested and do not move during normal braking operations.

Therefore the system provides redundancy, i.e. additional protection against the possibly leaky seating of the hydraulic 3/2-valve (isolation valve), so that even with a failure because of a leaky 3/2-valve seat, sufficient residual brake pressure is assured, at least above the legal values, during failure of the dynamic circuit.

Furthermore, because of the amount of pressure fluid locked up in the chambers of the isolation valve and the plunger-piston, very high elasticity is obtained, so that the residual air remaining in the chambers because of possible inadequate bleeding is compressed to the maximally highest operational pressure. Thus, during rapid braking, a movement of the piston of the isolation valve in the shutoff direction because of pressure loss is no longer possible. The piston of the isolation valve and also the plunger-piston are prestressed by the maximum operational pressure and cannot move during normal braking operation. On the other hand there is the advantage that in the case of ABS control and because of the "pressure reduction" position assumed by the ABS magnetic valves (customarily 3/3-way valves) the effects of shutoff on the actuating or regulation piston of the isolation valve as well as of the plunger-piston are cancelled, so that the ABS functions can be performed without restriction.

Advantageous embodiments and improvements of the system are set forth herein. In this connection it is advantageous that, because of the provision of a pressure control valve, a pressure limitation is assured in the event of an increase in volume in the shut-off chambers, for example due to heating.

The invention will be better understood and further objects and advantages thereof will become more apparent from the ensuing detailed description of preferred embodiments taken in conjunction with the drawings.

BRIEF DESCRIPTION OF THE DRAWINGS

FIG. 3 is a more detailed cross-sectional view of the hydraulic unit comprising the isolation valve and associated plunger-piston for the purpose of better understanding the invention.

DESCRIPTION OF THE PREFERRED EMBODIMENTS

The basic idea of the instant invention is to supply the unit comprising the hydraulic shutoff or isolation valve and the plunger-piston associated with each wheel in the static braking circuit with pressure from the ABS area in such a way that the chambers of the isolation valve as well as the rear chamber of the plunger-piston are maintained under pressure, and in this way the pistons are arrested in the initial position of the normal braking operation. As a result, faultless normal braking operation under all conditions is assured, while it is possible when changing to ABS control to switch over immediately from this position by means of the operation of the ABS magnetic valves which is then performing.

Figure 1:
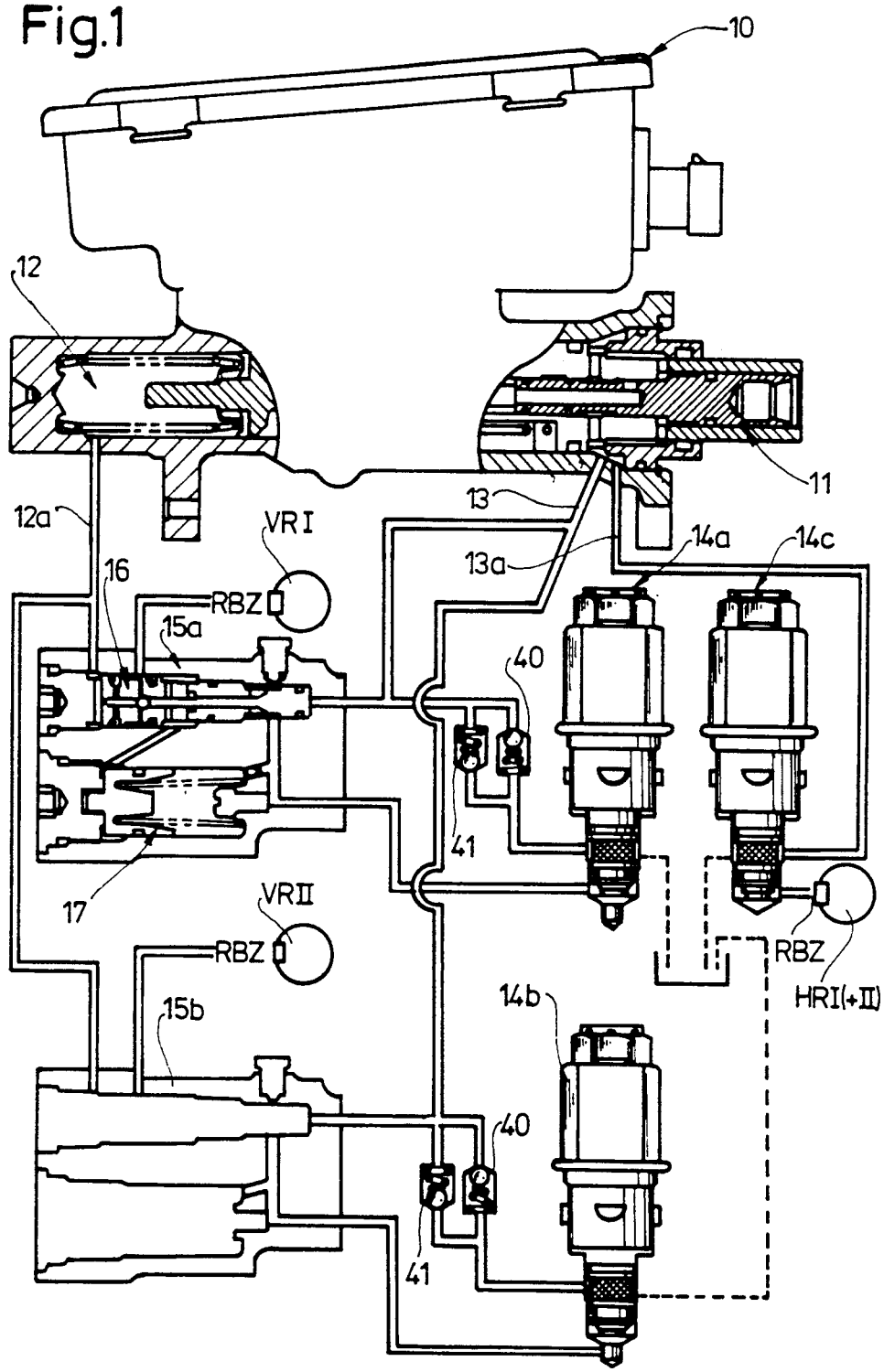
FIG. 1 is a schematic view partially in cross-section of a hydraulic brake booster with an ABS plunger system, where in the static circuit, the unit comprising the hydraulic isolation valve and the plunger-piston in connection with the ABS magnetic valves is associated for separate control with the front wheels, and in the dynamic circuit, ABS magnetic valves are associated with the rear wheel(s), and means for maintaining the pressure in the isolation valve and in the plunger-piston are provided for protecting the normal braking operation.

The ABS system illustrated in FIG. 1 comprises a known master brake cylinder 10, the actual structure of which need not be shown in detail since it is not the subject of the invention. In any case, the master brake cylinder is designed such that it includes a so-called dynamic circuit comprising a hydraulic brake booster, the control valve of which is shown at 11, and a so-called static circuit, the working pressure chamber of which is designated by 12 and which is connected via a hydraulic supply line 12a with the associated wheel brake cylinders. Besides the brake booster, the output line of which is designated by 13, the dynamic circuit of the master brake cylinder includes appropriate ABS magnetic valves which, in the customary case, are in the form of 3/3-way valves and in this way can perform the customary ABS control functions "reduce pressure", "maintain pressure" and "increase pressure". These ABS magnetic valves are designated in FIG. 1 by 14a, 14b and 14c.

The static circuit of the hydraulic brake system comprises a hydraulic unit, linked with the ABS magnetic valves of the dynamic circuit, for each wheel, preferably in the form of common hydraulic units 15a, 15b and each comprising a hydraulic shutoff or isolation valve 16 and an associated plunger-piston 17 each, shown in cross-section.

Figure 2:
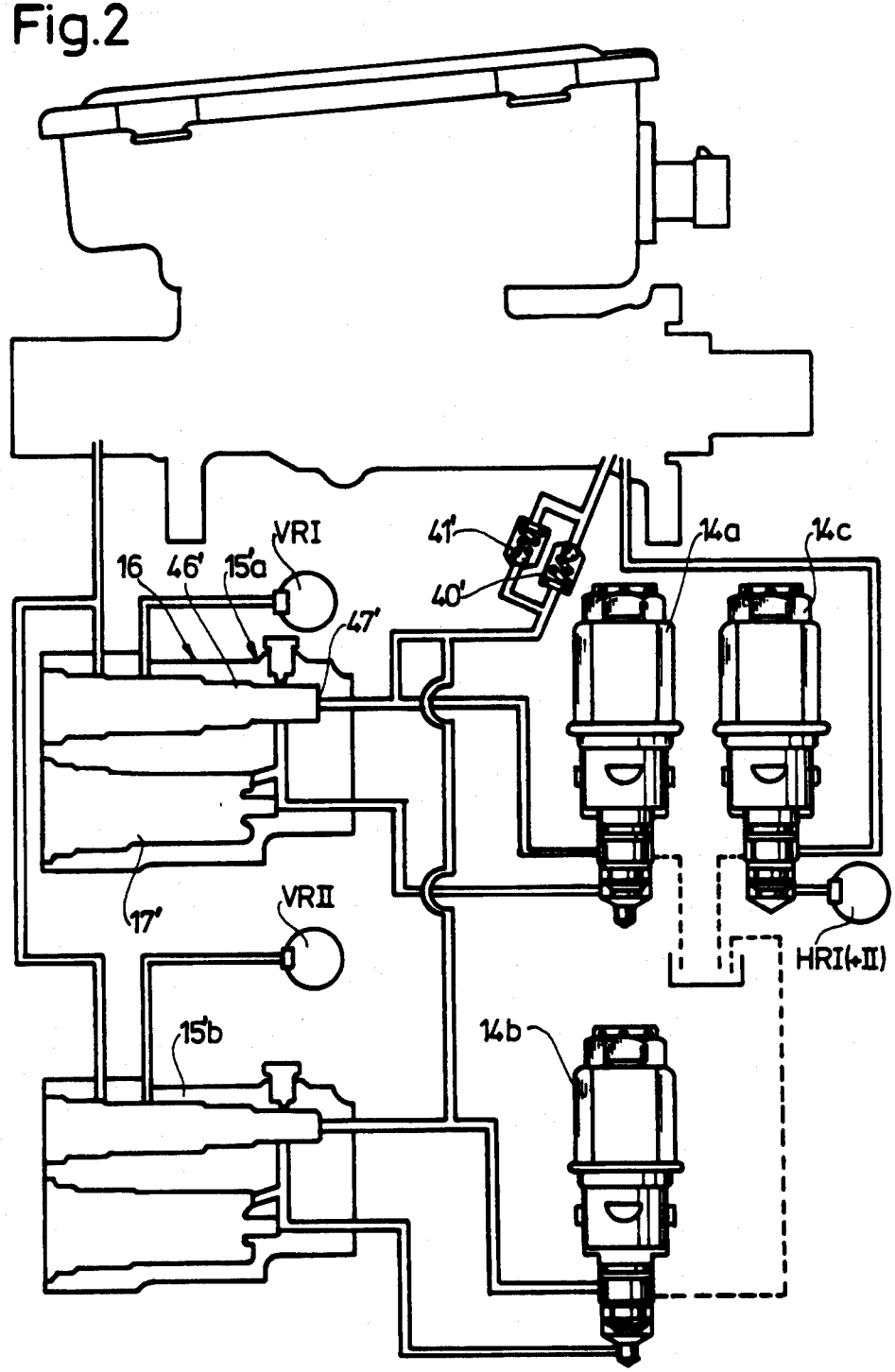
FIG. 2 is an alternate embodiment, where the means for maintaining the pressure are disposed in a common supply line of the static circuit of the master brake cylinder to the isolation valves.

It is first necessary, for understanding the invention, to address briefly the basic structure and function of the hydraulic unit shown in detail in FIG. 3. The basic structure of the hydraulic unit is almost identical for all partial hydraulic units shown in FIGS. 1 and 2 and wired accordingly, so that the description provided below is applicable for all embodiments. In FIGS. 1 and 2 the hydraulic units are only presented in outline for reasons of improved clarity.

Each hydraulic unit includes the hydraulically operated isolation valve 16 and an associated plunger-piston arrangement 17 cooperating with the isolation valve 16, the already mentioned ABS valve 14 in the customary 3/3-way form with the operational positions "increase pressure" (A), "maintain pressure" (B) and "reduce pressure" (C) also being a part of these two partial units. All or only certain partial units may be disposed in a common or in respectively separate housings; in the embodiment in accordance with FIG. 3, a common housing is provided for the hydraulically operated isolation valve 16 and the area of the plunger-piston 17.

The hydraulic unit 15 of FIG. 3 has a total of four connectors to the outside, namely a first connector 15a, which comes from the master brake cylinder 10, with an actuating pedal 10a, a second outlet connector 15b leading to one or more of the associated wheel brake cylinders 18, a third switch input connector 15c, which is connected with the dynamic pressure outlet of the brake booster, and finally a fourth control input connector 15d leading to the connection to the 3/3-way ABS control valve 14.

In the exemplary embodiment shown, the hydraulically operated isolation valve 16 is a 3/2-way switchover valve and has as an object to interrupt the connection between the master brake cylinder 10 and the respectively associated wheel brake cylinder(s) when the ABS function is initiated and to switch the area of the wheel brake cylinders to the plunger-piston system, which is correspondingly acted upon via the ABS control with the ABS valve 14 and performs the respective ABS function. For this purpose the isolation valve 16 has a switching or actuating piston 21 which is seated, such that it is slidingly movable, in a stepped cylinder bore 22 in the common housing 23 for the shutoff valve and the plunger-piston and which has a piston rod-like extension 21a which, in the drawing plane of FIG. 3, extends towards the left as far as the actual valve area 24. The piston rod-like extension extends through a stationary sealing stopper 25 which separates the valve area 24 from the switchover actuation area 26 containing the actuating piston 21. The offset front end area of the actuating rod 21a, which is also offset for the purpose of assuring the flow to and from the plunger-piston to the valve area via the connecting line 27 and the annular channel 28, determines the respective valve position of a (loose) valve ball 29, to which are assigned two oppositely located valve seats, looking in the axial direction of the shutoff valve, and which therefore can assume two closing positions, thus forming a 3/2-way valve, namely one when seated on a first valve seat 30 for shutting off the supply line coming from the master brake cylinder 10, and one when seated on a second valve seat 31 for shutting off the communication between the wheel brake cylinder and the plunger-piston.

This latter valve seat position, i.e. seated on the valve seat 31, is the normal braking position. It can be seen that in this case the communication from the inlet connector 15a from the master brake cylinder 10 to the wheel brake cylinder 18, is open via the inner connecting channels 33 with the longitudinal channel 34, along the valve seat 30 with the transverse channel 35 to the connecting channel 36 via the outlet connector 15b.

The other switching position is determined by the seating of the valve ball 29 on the seat 30. In this seating position the connecting channel 27 via the annular channel 28, along the seat 31 and back to the outlet channel 36 to the wheel brake cylinder 18 is open, while the connection to the master brake cylinder is completely closed. This other seating position is used for performing the ABS functions in accordance with a feedback-free ABS control, wherein the control operation (pressure swings of the hydraulic pressure fluid in the area plunger-piston as far as wheel brake cylinder) cannot be felt in the brake pedal 10a associated with the master brake cylinder 10, and this in none of the embodiments of the master brake cylinder, not even in the embodiment as a brake booster with a brake pressure valve as in the present case.

It is not necessary to go into details of the structure and function of this hydraulic unit 15, which is known per se; given the presupposed pressure equilibrium of the pressures obtaining at the inlets 15a and 15c of the isolation valve, the switchover of the actuating or control piston 21 of the isolation valve into the retracted normal braking position is assisted not only by the prestressing springs 37 and 38 acting in the direction towards opening pressure between the master brake cylinder 10 and the associated wheel brake cylinders 18, but also by the flow of the pressure in the dynamic circuit from the master brake cylinder via the pressure line 39 and the ABS magnetic valve that in switch position A is "open" to the front face pressure surface area 47 (i.e., the front as viewed here) of the control piston 21.

Because the pressure from the master brake cylinder or the brake booster is fed into its output lines (static circuit) and 39 (dynamic circuit) only in the case of braking, the invention provides a check valve 40 for the additional protection of the hydraulic 3/2-way isolation valve 16 which, in the exemplary embodiment of FIG. 3 corresponding to FIG. 1, is placed into the connecting line between the isolation valve connector 15a and via the 3/3-way magnetic ABS valve to the plunger-piston inlet 15d (and from there also in the continuing line 44, 44a).

In an advantageous manner, it is possible to dispose a pressure control valve 41 parallel to the check valve 40, which is set in such a way that it opens in case of operational pressures which are greater than the maximally allowable pressure during operation.

In accordance with the exemplary embodiment of FIG. 2, this valve combination of check valve 40' and pressure control valve 41' can also be placed into the common supply line from the dynamic circuit of the master brake cylinder to the hydraulic 3/2-way isolation valve 16 and, branched via the respective ABS magnetic valve, to the plunger-piston 17.

However, in this case an additional stepping of the rear, i.e. right part of the control piston 2 in the 3/2-way isolation valve becomes necessary to assure the equilibrium of forces at the piston in the non-braking position. It then is required, as indicated in FIG. 2, that the front surface 46' of the piston be equal to the rear surface 47' of the piston, which does not necessarily have to be the case in the illustration of FIG. 3 which, by the way, should only be considered qualitatively.

By means of the check valve combinations in FIGS. 1 and 2 the basic function ensues that in case of braking the free flow of the pressure fluid into the chambers of the hydraulic 3/2-way isolation valve as well as to the rear of the plunger-piston is made possible via the line 44 and a throttle point 43 (FIG. 3). However, return flow of the pressure fluid is prevented by the respective check valve 40, 40', so that the chambers of the hydraulic 3/2-way isolation valve and the rear chamber of the plunger-piston are kept under pressure. This means that the pistons are arrested during normal braking operation and cannot move, so that no amount of pressure fluid is received from the master cylinder. The pressure control valve 41, 41', disposed parallel to the respective check valve, is used for limiting the pressure when the material expands, for example because of heating, in the respective valve chambers, the pressure control valves opening, as already mentioned, at operational pressures higher than the maximal pressure allowable during operation.

In particular, the hydraulic brake booster unit with an ABS plunger system in the form illustrated in FIGS. 1 and 2 may be the separate brake pressure supply and ABS control for each of the two front wheel circuits VRI and VRII which are acted upon by the unit formed by the isolation valve and plunger-piston, while pressure supply for the rear wheel(s) comes from a second pressure line 13a, connected to the dynamic circuit of the brake booster control valve, via the ABS magnetic valve 14c.

The foregoing relates to preferred exemplary embodiments of the invention, it being understood that other variants and embodiments thereof are possible within the spirit and scope of the invention, the latter being defined by the appended claims.

What is claimed and desired to be secured by Letters Patent of the United States is:

1. A method for feedback-free ABS control in hydraulic brakes for mobile units, motor vehicles, motorcycles, which comprises operating a pedal-operated master brake cylinder and hydraulic brake booster, applying fluid pressure to at least one isolation or shut-off 3/2-way valve in case of normal braking, feeding pressure to associated front wheel brake cylinders in a static circuit, where in case of ABS operation, blocking a connection between the wheel brake cylinder(s) and the master brake cylinder by operation of said isolation valve, operating an ABS 3/3 way valve to open a hydraulic pressure line between said master brake cylinder and an associated plunger-piston controlled by said ABS 3/3-way valve, arresting said pistons during normal braking operation because of entry of pressure fluid into a chamber of each hydraulic 3/2-way isolation valve and on a rear of the plunger-piston, blocking of a return flow of fluid in such a way, that said pistons do not move during normal braking operation.

2. A method in accordance with claim 1 which comprise continuously maintaining said chambers of the hydraulic 3/2-way isolation valve and a rear of the plunger-piston at a pressure of the pressure fluid below the pressure maximally permissible during operation, which is only suddenly reduced in case of ABS operation.

3. A method in accordance with claim 2, maintaining an equilibrium of forces at the actuating or control piston of the 3/2-way isolation valve by a supply of equal pressure to the static and dynamic circuits by the hydraulic brake booster, or by a corresponding stepping of the control piston.

4. A method in accordance with claim 1, maintaining an equilibrium of forces at the actuating or control piston of the 3/2-way isolation valve by a supply of equal pressure to the static and dynamic circuits by the hydraulic brake booster, or by a corresponding stepping of the control piston.

5. An apparatus for feedback-free, ABS control in hydraulic brakes for mobile units, motor vehicles, motorcycles, and the like, comprising a pedal-operated master brake cylinder and hydraulic brake booster, at least one isolation or shutoff 3/2-way valve acted upon with pressure by said hydraulic brake booster in case of normal braking, for feeding pressure to the associated front wheel brake cylinders in a static circuit, in case of ABS operation said isolation valve blocks a connection between the wheel brake cylinder(s) and the master brake cylinder, and an ABS 3/3 way magnetic valve in a hydraulic pressure line between said master brake cylinder and an associated plunger-piston (17), is opened, for performing an ABS control of said wheel brake cylinder, a check valve (40) in a connecting line between said 3/2-way isolation valve said 3/3-ABS magnetic valve (14a, 14b) and the plunger-piston (17), said check valve (40) maintains any pressure increase formed in the chambers of the hydraulic 3/2-way isolation valve and on the rear of the plunger-piston and arrests the pistons during each case of normal braking.

6. An apparatus in accordance with claim 5, in which a pressure control valve (41, 41') is disposed parallel to each of the check valves (40, 40'), and said pressure control valve (41, 41') opens when operational pressures higher than a maximum allowable pressure occurs.

7. An apparatus for feedback-free ABS control in hydraulic brakes for mobile units, motor vehicles, motorcycles, which comprise a pedal-operated master brake cylinder and hydraulic brake booster, at least one isolation or shutoff valve 3/2-way valve which is acted upon with pressure by the latter in case of normal braking, for feeding pressure to the associated front wheel brake cylinders in the static circuit, in case of ABS operation a connection between the wheel brake cylinder(s) and the master brake cylinder is blocked by the isolation valve, and a hydraulic pressure line between said master brake cylinder and an associated plunger-piston, controlled by an ABS 3/3-way valve is opened, for performing an ABS control of said wheel brake cylinders, a check valve (40') disposed in a common hydraulic supply line from a dynamic circuit of said master brake cylinder (10) to the hydraulic 3/2-way isolation valve (15a', 15i'), to the 3/3-way ABS magnetic valve (14a, 14b) and to the plunger-piston (17'), which maintains any pressure increase formed in the chambers of the hydraulic 3/2-way isolation valve and on the rear of the plunger-piston and arrests the pistons during each case of normal braking.

8. An apparatus in accordance with claim 7, in which a pressure control valve (41, 41') is disposed parallel to each of the check valves (40, 40'), and said pressure control valve (41, 41') opens when operational pressures higher than a maximum allowable pressure occurs.

9. An apparatus in accordance with claim 7, in which for assuring the equilibrium of forces of the pressures acting on the actuating piston a front surface (46') of the actuating piston, minus the end surface of a piston actuating rod (21), has the same size as a rear face surface (47') of the actuating piston of the 3/2 way isolation valve for assuring an equilibrium of forces of the pressure acting on said actuation piston.

* * * * *